(12) United States Patent
Lee et al.

(10) Patent No.: US 10,725,845 B2
(45) Date of Patent: Jul. 28, 2020

(54) METHODS OF OPERATING MEMORY SYSTEM

(71) Applicant: Samsung Electronics Co., Ltd., Suwon-si (KR)

(72) Inventors: Kyu-Dong Lee, Seoul (KR); Baek-Kyu Choi, Yongin-si (KR); Ji-Won Kim, Yongin-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 219 days.

(21) Appl. No.: 15/683,181

(22) Filed: Aug. 22, 2017

(65) Prior Publication Data

US 2018/0165223 A1 Jun. 14, 2018

(30) Foreign Application Priority Data

Dec. 9, 2016 (KR) ........................ 10-2016-0167619

(51) Int. Cl.
| | | |
|---|---|---|
| *G06F 11/00* | (2006.01) | |
| *G06F 11/07* | (2006.01) | |
| *G06F 12/14* | (2006.01) | |
| *G06F 21/57* | (2013.01) | |
| *G06F 12/06* | (2006.01) | |
| *G06F 12/02* | (2006.01) | |
| *G06F 21/79* | (2013.01) | |

(52) U.S. Cl.
CPC ........ *G06F 11/073* (2013.01); *G06F 11/0751* (2013.01); *G06F 11/0772* (2013.01); *G06F 12/0238* (2013.01); *G06F 12/0638* (2013.01); *G06F 12/14* (2013.01); *G06F 21/575* (2013.01); *G06F 21/79* (2013.01); *G06F 2212/1052* (2013.01); *G06F 2212/202* (2013.01); *G06F 2212/205* (2013.01)

(58) Field of Classification Search
CPC .... G06F 11/07; G06F 11/073; G06F 11/0751; G06F 11/0772; G06F 11/167; G06F 11/2278; G06F 11/2284; G06F 12/14; G06F 12/0238; G06F 12/0638; G06F 21/575; G06F 21/79; G06F 2212/1052; G06F 2212/202; G06F 2212/205
See application file for complete search history.

(56) References Cited

U.S. PATENT DOCUMENTS

| | | |
|---|---|---|
| 8,332,653 B2 | 12/2012 | Buer |
| 8,601,229 B2 | 12/2013 | Morgan et al. |
| 8,631,212 B2 | 1/2014 | Kegel et al. |
| 8,925,098 B2 | 12/2014 | Hyde et al. |
| 9,323,954 B2 | 4/2016 | Mittal |
| 9,396,134 B2 | 7/2016 | Wooten |
| 2006/0010314 A1 | 1/2006 | Xu |

(Continued)

*Primary Examiner* — Joseph D Manoskey
(74) *Attorney, Agent, or Firm* — Muir Patent Law, PLLC

(57) ABSTRACT

A method of operating a memory system includes setting a secured area in a volatile memory device of the memory system during a secure mode, writing secure data in the secured area during the secure mode, and when a write command for the secured area is inputted in a normal operation mode, preventing a write operation from occurring and generating an error signal. Accordingly, the secured area is set in the volatile memory device so that the hacking and the data forgery may be prevented.

17 Claims, 10 Drawing Sheets

(56) References Cited

U.S. PATENT DOCUMENTS

| | | | |
|---|---|---|---|
| 2006/0015749 A1* | 1/2006 | Mittal | G06F 12/1441 |
| | | | 713/190 |
| 2006/0149917 A1* | 7/2006 | O'Connor | G06F 12/1441 |
| | | | 711/173 |
| 2011/0078760 A1* | 3/2011 | De Perthuis | G06F 21/6218 |
| | | | 726/1 |
| 2012/0210115 A1* | 8/2012 | Park | H04L 9/3242 |
| | | | 713/2 |
| 2016/0070934 A1* | 3/2016 | Frank | G06F 21/572 |
| | | | 711/103 |
| 2016/0125187 A1* | 5/2016 | Oxford | G06F 21/575 |
| | | | 713/2 |
| 2016/0217086 A1 | 7/2016 | Shan et al. | |

* cited by examiner

METHODS OF OPERATING MEMORY SYSTEM

CROSS-REFERENCE TO RELATED APPLICATION

This application claims priority under 35 USC § 119 to Korean Patent Application No. 10-2016-0167619, filed on Dec. 9, 2016 in the Korean Intellectual Property Office (KIPO), the contents of which are herein incorporated by reference in their entirety.

BACKGROUND

1. Technical Field

Exemplary embodiments relate to methods of operating a memory system, and more particularly to methods of operating a memory system including setting a secured area in a memory device.

2. Description of the Related Art

To prevent hacking of a memory device, in conventional methods, a firewall may block a malicious code from an external device using an authentication key or a vaccine program may prevent an installation of the malicious code.

However, when a user directly installs a program including the malicious code or an unknown malicious code is installed by a method such as smishing, the memory device may not be protected from the hacking. Accordingly, a memory system or a memory device is desired to prevent hacking caused by the user.

SUMMARY

Exemplary embodiments provide a method of operating a memory system including setting a secured area in a volatile memory device to prevent hacking and data forgery.

According to exemplary embodiments, a method of operating a memory system provides. The method includes, when the memory system is being booted, by a memory controller of the memory system, setting a secured area in a volatile memory device of the memory system during a secure mode of a booting process, by the memory controller, writing secure data in the secured area during the secure mode, and after ending the booting process, when the volatile memory device receives a write command for the secured area during a normal operation mode, preventing a write operation from occurring in the volatile memory device and generating an error signal from the volatile memory device.

According to exemplary embodiments, a method of operating a memory system provides. The method includes, by a memory controller of the memory system, setting a secured area in a volatile memory device of the memory system during a secure mode, by the memory controller, writing secure data in the secured area during the secure mode, and when the memory controller receives a write command for the secured area during a normal operation mode, preventing the write command from being transmitted to the volatile memory device and generating a first error signal from the memory controller.

According to exemplary embodiments, a method of operating a memory system provides. The method includes, by a memory controller of the memory system, when the memory system is being booted, permitting a first area in a volatile memory device of the memory system to store first data during a first mode of a booting process, and after ending the booting process, when the memory system is requested a write operation for the first area, preventing the write operation from occurring in the volatile memory device and generating a first error signal. The first area includes a start address and an ending address. The first mode is operated before an operating system (OS) is loaded.

According to the method of operating the memory system, the secured area is set in the volatile memory device in a secure mode. In addition, the secured area is a read-only area in a normal operation mode so that data may not be written in the secured area. Thus, the hacking of the volatile memory device and the data forgery by abnormal access to the volatile memory device may be prevented.

BRIEF DESCRIPTION OF THE DRAWINGS

The above and other features and advantages of the present embodiments will become more apparent by describing in detailed exemplary embodiments thereof with reference to the accompanying drawings, in which.

DETAILED DESCRIPTION

Figure 1:
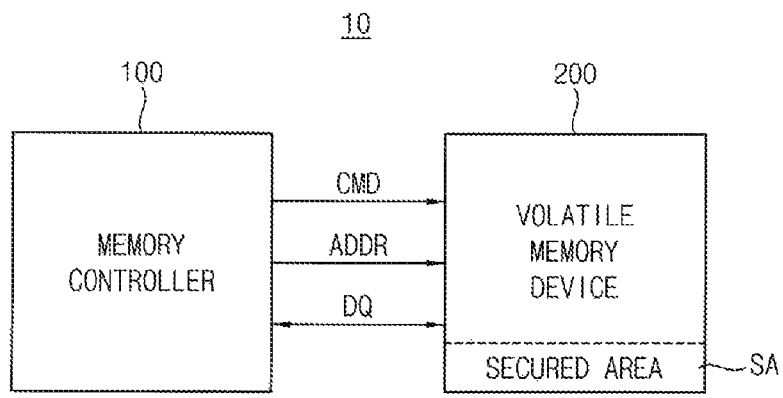
FIG. 1 is a block diagram illustrating a memory system according to exemplary embodiments.

Various exemplary embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

It will be understood that, although the terms first, second, third etc. may be used herein to describe various elements, these elements should not be limited by these terms. Unless indicated otherwise, these terms are generally used to distinguish one element from another. Thus, a first element discussed below in one section of the specification could be termed a second element in a different section of the specification without departing from the teachings of the present disclosure. Also, terms such as "first" and "second" may be used in the claims to name an element of the claim, even thought that particular name is not used to describe in connection with the element in the specification. As used herein, the term "and/or" includes any and all combinations of one or more of the associated listed items.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram illustrating a memory system according to exemplary embodiments.

Referring to FIG. 1, a memory system may include a memory controller 100 and a volatile memory device 200. The memory system 10 may further include a plurality of signal lines which electrically connect the memory controller 100 with the volatile memory device 200. The memory system 10 may further include a nonvolatile memory device (shown in FIGS. 6 and 8).

The volatile memory device 200 is controlled by the memory controller 100. For example, based on requests from a host (not shown), the memory controller 100 may store (e.g., write or program) data into the volatile memory device 200, or may retrieve (e.g., read or sense) data from the volatile memory device 200. In addition, the memory controller 100 may input an address to the volatile memory device 200.

Although not shown in figures, the memory controller 100 may be connected to the host to communicate with the host. Alternatively, the memory controller 100 may be included in the host.

The plurality of signal lines may include command transferring lines, address transferring lines and data input/output (I/O) lines. At least a portion or all of the signal lines may be referred to as a channel.

The memory controller 100 may transfer a command signal CMD to the volatile memory device 200 through the command transferring line. The memory controller 100 may transfer an address signal ADDR to the volatile memory device 200 through the address transferring line. The memory controller 100 may exchange data DQ with the volatile memory device 200 through the data I/O line. The memory controller 100 may output data DQ to the volatile memory device 200 or receive the data DQ from the volatile memory device 200 in response to a request of the host.

Figure 2:
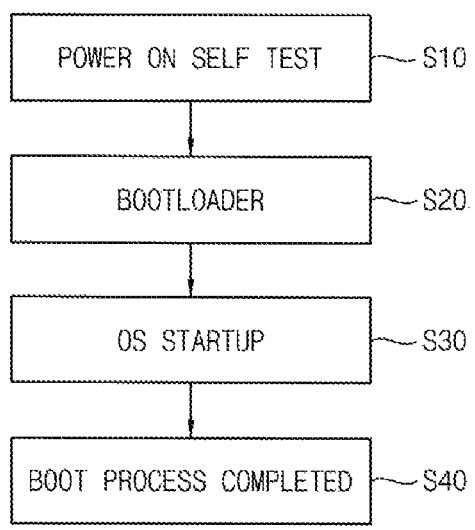
FIG. 2 is a flowchart illustrating booting the memory system of FIG. 1 according to exemplary embodiments.

FIG. 2 is a flowchart illustrating booting the memory system of FIG. 1 according to exemplary embodiments.

Referring to FIGS. 1 and 2, when the memory system 10 boots, a booting process of the memory system 10 may be performed. The booting process of the memory system may include a step of power on self test (step S10), a step of bootloader (step S20), a step of OS (operating system) startup (step S30) and a step of completing the booting process (S40).

In general, an operating system (OS) is system software that manages computer hardware and software resources and provides common services for computer programs. Generally, all computer programs, excluding firmware, require an operating system to function. For hardware functions such as input and output and memory allocation, the operating system acts as an intermediary between programs and the computer hardware, although the application code is usually executed directly by the hardware and frequently makes system calls to an OS function or is interrupted by it. Operating systems are found on many devices that contain an electronic device such as computers, cellular phones, or video game consoles to web servers and supercomputer.

In the step of power on self test (step S10), the memory system and devices connected to the memory system operate a self test. An input/output device, a control device and a storage device connected to the memory system are tested to determine whether the devices operate accurately or not when the memory system is booted.

In the step of bootloader (step S20), programs to load the OS are prepared. The bootloader may include one or more programs to load the OS.

In the step of OS startup (step S30), the operation of the OS is started using the bootloader. The OS may be stored, for example, in a nonvolatile memory device.

The step of completing the booting process (S40), the booting process is completed so that the memory system is ready to operate a normal operation. The normal operation (or, a normal operation mode) may include a read, a write, a refresh, an active, or a precharge operation other than a test operation, bootloader operation, or OS startup operation.

Referring again to FIG. 1, the memory controller 100 may set a secured area SA in the volatile memory device 200 in a secure mode. When the memory system is being booted, the secure mode may be performed before the OS is loaded. For example, when the memory system is booted, the secure mode may be performed during a basic input/output system (BIOS) level. Thus, the "secure mode" may refer to a mode prior to which an OS is completely loaded. During this mode the OS is not operating, and so hacking related to accessing programs via an operational OS cannot be carried out. In one embodiment, a write operation and a reading operation are allowed for the secured area SA during the secure mode. In certain embodiments, only the reading operation is allowed for the secured area SA in the normal operation mode.

The secured area SA may be set before the memory system is electrically connected to a network and an external port. For example, the secured area SA may be set before the OS is loaded. After the OS is loaded the memory system may be electrically and logically connected to the network and the external port.

The secured area SA may be set in one of the step of power on self test (step S10) and the step of bootloader (step S20).

For example, the secured area SA may be set when the memory system is being booted. For example, the secured area SA may be set in the BIOS level when the memory system is being booted. The BIOS is a program processing fundamental functions of the memory system or a computing system including the memory system. The BIOS may be a lowest layer of layers of software. Application softwares may be operated based on the BIOS level.

Figure 3:
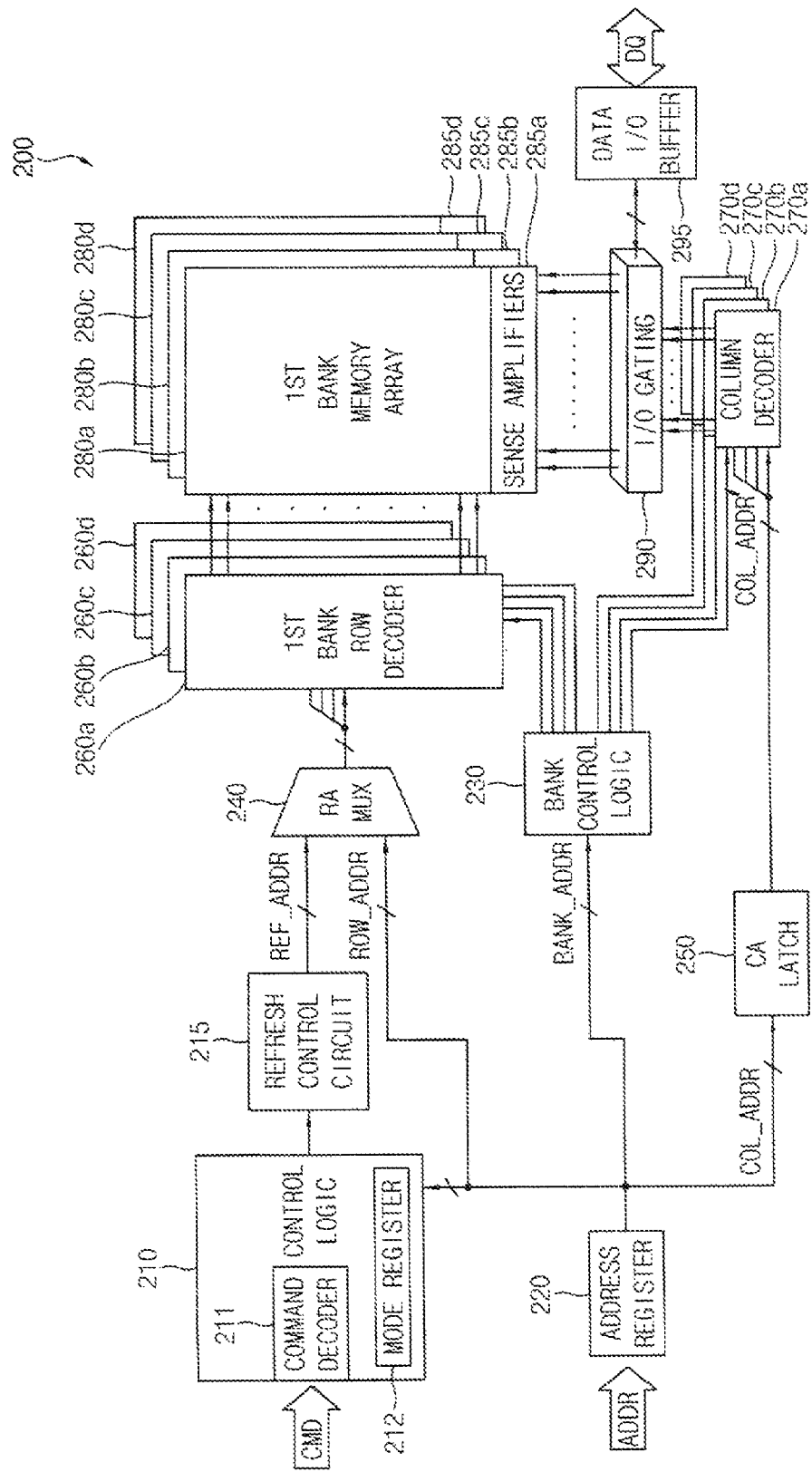
FIG. 3 is a block diagram illustrating a volatile memory device of FIG. 1 according to exemplary embodiments.

FIG. 3 is a block diagram illustrating the volatile memory device 200 of FIG. 1 according to exemplary embodiments.

Referring to FIG. 3, the volatile memory device 200 includes a control logic circuit 210, a refresh control circuit 215, an address register 220, a bank control logic circuit 230, a row address multiplexer 240, a column address latch 250, a row decoder, a column decoder, a memory cell array, a sense amplifier unit, an input/output (I/O) gating circuit 290 and a data I/O buffer 295.

The memory cell array may include a plurality of bank arrays, e.g., first to fourth bank arrays 280a, 280b, 280c and 280d. The row decoder may include a plurality of bank row decoders, e.g., first to fourth bank row decoders 260a, 260b, 260c and 260d connected to the first to fourth bank arrays 280a, 280b, 280c and 280d, respectively. The column decoder may include a plurality of bank column decoders, e.g., first to fourth bank column decoders 270a, 270b, 270c and 270d connected to the first to fourth bank arrays 280a, 280b, 280c and 280d, respectively. The sense amplifier unit may include a plurality of bank sense amplifiers, e.g., first to fourth bank sense amplifiers 285a, 285b, 285c and 285d connected to the first to fourth bank arrays 280a, 280b, 280c and 280d, respectively. The first to fourth bank arrays 280a~280d, the first to fourth bank row decoders 260a~260d, the first to fourth bank column decoders 270a~270d, and the first to fourth bank sense amplifiers 285a~285d may form first to fourth banks, respectively. For example, the first bank array 280a, the first bank row decoder 260a, the first bank column decoder 270a, and the first bank sense amplifier 285a may form the first bank; the second bank array 280b, the second bank row decoder 260b, the second bank column decoder 270b, and the second bank sense amplifier 285b may form the second bank; the third bank array 280c, the third bank row decoder 260c, the third bank column decoder 270c, and the third bank sense amplifier 285c may form the third bank; and the fourth bank array 280d, the fourth bank row decoder 260d, the fourth bank column decoder 270d, and the fourth bank sense amplifier 285d may form the fourth bank. Although FIG. 3 illustrates the volatile memory device 200 including four banks, in other exemplary embodiments, the volatile memory device 200 may include any number of banks.

The address register 220 may receive an address ADDR including a bank address BANK_ADDR, a row address ROW_ADDR and a column address COL_ADDR from a memory controller (e.g., the memory controller 100 in FIG. 1). The address register 220 may provide the received bank address BANK_ADDR to the bank control logic circuit 230, may provide the received row address ROW_ADDR to the row address multiplexer 240, and may provide the received column address COL_ADDR to the column address latch 250.

The bank control logic circuit 230 may generate bank control signals in response to the received bank address BANK_ADDR. One of the first to fourth bank row decoders 260a~260d corresponding to the received bank address BANK_ADDR may be activated in response to the bank control signals generated by the bank control logic circuit 230, and one of the first to fourth bank column decoders 270a~270d corresponding to the received bank address BANK_ADDR may be activated in response to the bank control signals generated by the bank control logic circuit 230.

The refresh control circuit 215 may generate a refresh address REF_ADDR in response to a refresh command. For example, the refresh control circuit 215 may include a refresh counter that is configured to sequentially change the refresh address REF_ADDR from a first address of the memory cell array to a last address of the memory cell array.

The row address multiplexer 240 may receive the row address ROW_ADDR from the address register 220, and may receive the refresh address REF_ADDR from the refresh control circuit 215. The row address multiplexer 240 may selectively output the row address ROW_ADDR or the refresh address REF_ADDR. A row address output from the row address multiplexer 240 (e.g., the row address ROW_ADDR or the refresh address REF_ADDR) may be applied to the first to fourth bank row decoders 260a~260d.

The activated one of the first to fourth bank row decoders 260a~260d may decode the row address output from the row address multiplexer 240, and may activate a wordline corresponding to the row address. For example, the activated bank row decoder may apply a wordline driving voltage to the wordline corresponding to the row address.

The column address latch 250 may receive the column address COL_ADDR from the address register 220, and may temporarily store the received column address COL_ADDR. The column address latch 250 may apply the temporarily stored or received column address COL_ADDR to the first to fourth bank column decoders 270a~270d.

The activated one of the first to fourth bank column decoders 270a~270d may decode a column address COL_ADDR' output from the column address latch 250, and may control the I/O gating circuit 290 to output data corresponding to the column address COL_ADDR'.

The I/O gating circuit 290 may include a circuitry for gating I/O data. For example, although not shown, the I/O gating circuit 290 may include an input data mask logic, read data latches for storing data output from the first to fourth bank arrays 280a~280d, and write drivers for writing data to the first to fourth bank arrays 280a~280d.

Data to be read from one of the first to fourth bank arrays 280a~280d may be sensed by a sense amplifier coupled to the one bank array, and may be stored in the read data latches. The data stored in the read data latches may be provided to the memory controller via the data I/O buffer 295 and data bus (or, data terminals) DQ. Data received via data terminals DQ to be written to one of the first to fourth bank arrays 280a~280d may be provided from the memory controller to the data I/O buffer 295. The data received via data terminals DQ provided to the data I/O buffer 295 may be written to the one bank array via the write drivers.

The control logic circuit 210 may control an operation of the volatile memory device 200. For example, the control logic circuit 210 may generate control signals for the volatile memory device 200 to perform a write operation or a read operation. The control logic circuit 210 may include a command decoder 211 that decodes a command CMD received from the memory controller and a mode register 212 that sets an operation mode of the volatile memory device 200. For example, the command decoder 211 may generate the control signals corresponding to the command CMD by decoding a write enable signal (e.g., /WE), a row address strobe signal (e.g., /RAS), a column address strobe signal (e.g., /CAS), a chip select signal (e.g., /CS), etc. The control logic circuit 210 may further receive a clock signal (e.g., CLK) and a clock enable signal (e.g., /CKE) for operating the volatile memory device 200 in a synchronous manner.

Figure 4:
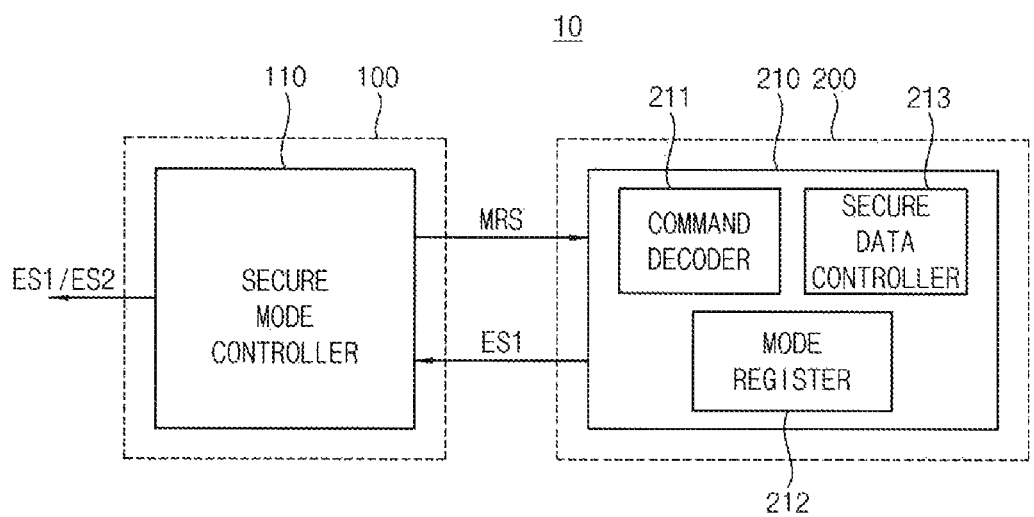
FIG. 4 is a block diagram illustrating an operation of the memory system of FIG. 1 according to exemplary embodiments.
Figure 5:
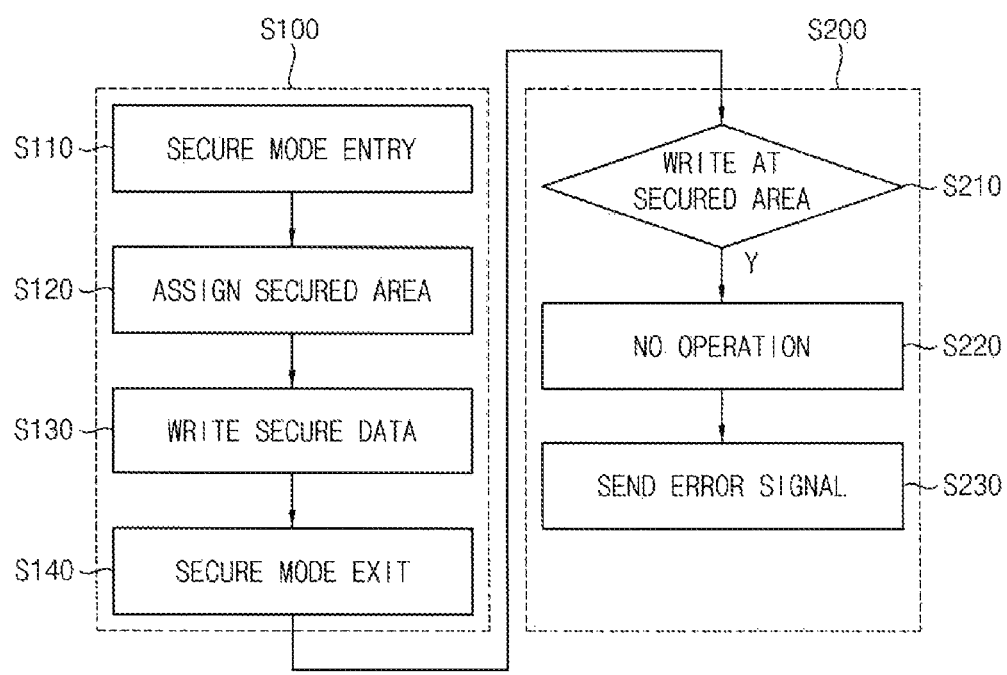
FIG. 5 is a flowchart illustrating the operation of the memory system of FIG. 1 in a secure mode and a normal operation mode, according to exemplary embodiments.

FIG. 4 is a block diagram illustrating an operation of the memory system of FIG. 1 according to exemplary embodiments. FIG. 5 is a flowchart illustrating the operation of the memory system of FIG. 1 in a secure mode and a normal operation mode according to exemplary embodiments.

Referring to FIGS. 1, 4 and 5, the memory controller 100 may include a secure mode controller 110. The secure mode controller 110 sets the secured area SA in the volatile memory device 200.

The control logic circuit 210 of the volatile memory device 200 may include a command decoder 211, the mode register 212 and a secure data controller 213. The command decoder 211 decodes the command CMD received from the memory controller 100. The mode register 212 sets the operation mode of the volatile memory device 200. The secure data controller 213 prohibits the write operations to the secured area SA.

In the present exemplary embodiment, the secure data controller 213 may be a functional and logical block, not a physical block.

The mode register 212 may store secure area setting information corresponding to the secured area SA. For example, the secure mode controller 110 may store the secure area setting information in the mode register 212 using a mode register setting signal MRS. For example, the mode register setting signal MRS may be a hidden mode register setting signal.

When the write command for the secured area SA is inputted in the normal operation mode, the secure data controller 213 may not operate the write operation and may generate a first error signal ES1. For example, the secure data controller 213 may transmit the first error signal ES1 to the secure mode controller 110 of the memory controller 100.

In example embodiments, when the secure mode controller 110 receives the first error signal ES1 from the secure data controller 213 during the normal operation, the memory controller 100 may transmit the first error signal ES1 to the host. In example embodiments, when the write operation of the volatile memory device 200 is requested for the secured area SA during the normal operation, the memory controller 100 may transmit a second error signal ES2 to the host. In this case, the memory controller 100 may not transmit a write command to the volatile memory device 200.

Referring to FIG. 5, the secure mode S100 may include a step of secure mode entry (step S110), a step of assigning the secured area (step S120), a step of writing secure data (step S130) and a step of secure mode exit (step S140).

After the secure mode is started (step S110), which may be for example at power on of the device, the secured area SA is set in the volatile memory device 200 (step S120).

For example, the secured area SA may be set by a start address of the secured area SA and an end address of the secured area SA.

For example, a size of the secured area SA may be set by a policy such that the size of the secured area SA does not exceed a predetermined limit. The predetermined limit of the size of the secured area SA may be set as a percentage with respect to a total memory size of the volatile memory device 200.

The secure data is written in the secured area SA (step S130). For example, the secure data may include at least one of a kernel of the OS and user data. For example, the secure data may include a header file of an essential application. In some embodiments, the secure data is secure because it is written during the secure mode, for example, prior to the OS startup completion, and thus prior to any logical connection by the device to a network. Therefore, the secure data cannot be hacked because of the stage in the bootup process in which it is written to the secured area SA. In addition, the secure data remains secure during normal operation because of the security protocol described herein (e.g., write-prevention after completion of bootup).

For example, the secure data may be copied data of an original secure data stored in the nonvolatile memory device. For example, the secure data may be copied data of the original secure data stored in a read-only memory (ROM). For example, the secure data may be copied data of the original secure data stored in a nonvolatile storage device. For example, the nonvolatile storage device may be a solid state drive device.

After the secure data is written in the secured area SA, the secure mode is terminated (step S140). For example, this may occur after and as a result of completion of the OS startup.

When the secure mode is terminated, the memory system may be operated in the normal operation mode S200.

In the normal operation mode S200, the write operation and the reading operation for the data in an area excluding the secured area SA are allowed. However, in the normal operation mode S200, the write operation for the data in the secured area SA is not allowed. In the normal operation mode S200, only the reading operation for the data in the secured area SA is allowed. Thus, in some embodiments, the secure mode is described herein as a write-permitted mode, with respect to the secure area, and the normal operation mode is described as a write-prevention mode, with respect to the secure area.

When the write command to the secured area SA is inputted (step S210), the write operation is not operated in the volatile memory device 200 (step S220).

In addition, when the write command for the secured area SA is inputted, the first error signal ES1 is generated by the control logic circuit 210 of the volatile memory device 200 and transmitted to the memory controller 100 (step S230).

Figure 6:
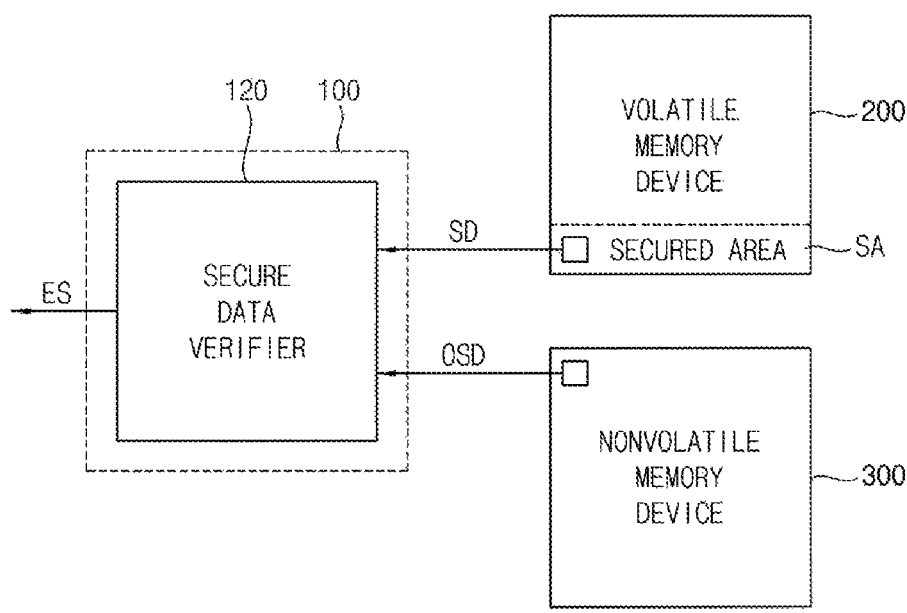
FIG. 6 is a block diagram illustrating an operation of the memory system of FIG. 1 according to other exemplary embodiments.
Figure 7:
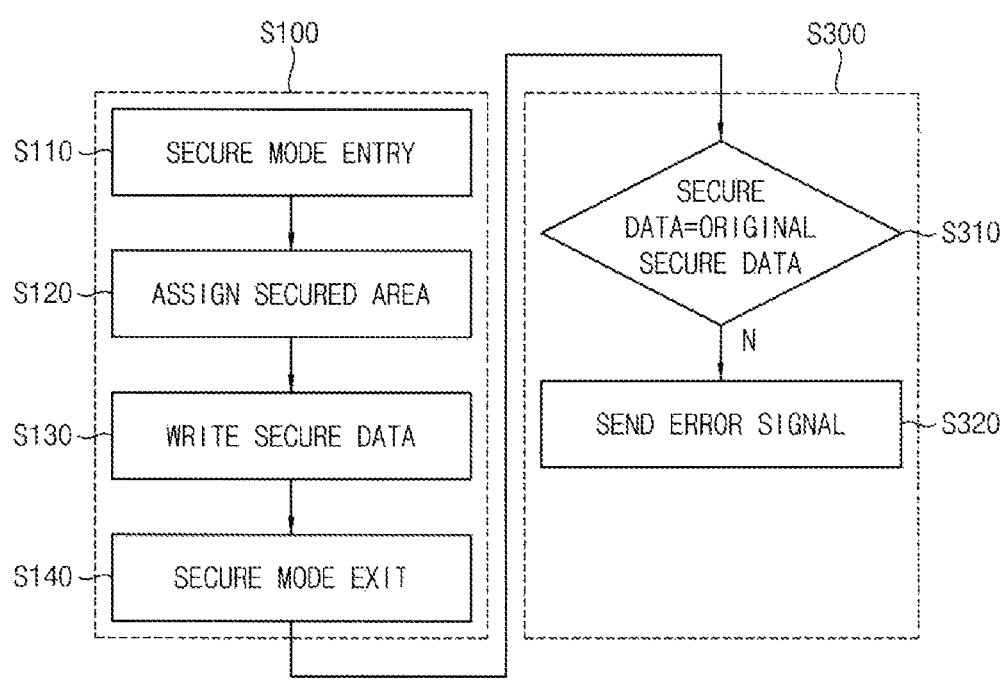
FIG. 7 is a flowchart illustrating the operation of the memory system of FIG. 1 in the secure mode and a verification mode according to exemplary embodiments.

FIG. 6 is a block diagram illustrating an operation of the memory system of FIG. 1 according to other exemplary embodiments. FIG. 7 is a flowchart illustrating the operation of the memory system of FIG. 1 in the secure mode S100 and a verification mode S300 according to exemplary embodiments.

Referring to FIGS. 4, 5, 6 and 7, the memory system includes the memory controller 100 and the volatile memory device 200 controlled by the memory controller 100. The volatile memory device 200 includes the secured area SA. The memory system may further include an additional memory device 300. In the present exemplary embodiment, the additional memory device 300 may be a nonvolatile memory device 300.

The memory controller 100 may include the secure mode controller 110. The secure mode controller 110 sets the secured area SA in the volatile memory device 200.

The volatile memory device 200 may include the control logic circuit 210. The control logic circuit 210 of the volatile memory device 200 may include the command decoder 211, the mode register 212 and the secure data controller 213. The command decoder 211 decodes the command CMD received from the memory controller 100. The mode register 212 sets the operation mode of the volatile memory device 200. The secure data controller 213 prohibits the write operations to the secured area SA.

The memory controller 100 may further include a secure data verifier 120. The secure data verifier 120 operates the verification operation S300 of the memory system. The secure data verifier 120 may receive secure data SD stored in the secured area SA of the volatile memory device 200 and an original secure data OSD stored in the nonvolatile memory device 300. The original secure data OSD of the nonvolatile memory device 300 may be stored during manufacturing of the memory system 10, or during installation of an operating system. The secure data verifier 120 may determine whether the secure data SD and the original secure data OSD are same as each other or not.

When the secure data SD and the original secure data OSD are different from each other, the secure data verifier 120 may generate an error signal ES (e.g., a third error signal ES3). The secure data verifier 120 may transmit the error signal ES to the host.

In the present exemplary embodiment, the secure data verifier 120 may be a functional and logical block, not a particular physical block.

Referring to FIG. 7, the secure mode S100 may include a step of secure mode entry (step S110), a step of assigning the secured area (step S120), a step of writing secure data (step S130) and a step of secure mode exit (step S140).

When the secure mode is started (step S110), the secured area SA is set in the volatile memory device 200 (step S120).

The secure data is written in the secured area SA (step S130).

When the secure data is written in the secured area SA, the secure mode is terminated (step S140).

When the secure mode is terminated, the memory system may be operated in the normal operation mode S200. In the normal operation mode S200, the memory system may be operated in the verification mode S300.

In the verification mode S300, the secure data SD stored in the secured area SA and the original secured data OSD, which are the original data of the secure data SD and stored in the nonvolatile memory device 300, are compared (step S310).

In the verification mode S300, when the secure data SD and the original secured data OSD are different from each other, the error signal ES is generated and transmitted to the host (step S320). For example, the memory controller 100 may transmit the third error signal ES3 to the host.

The original secured data OSD may be data which should not be changed by hacking or the malicious code when the memory system or the computing system including the memory system is booted.

The secure data SD is protected in the secured area SA not to be changed. Thus, if the secure data SD and the original secured data OSD are different from each other, it may be determined that the original secured data OSD is changed. Therefore, the memory controller 100 transmits the third error signal ES3 to the host.

In addition, if the secure data SD in the secured area SA are not properly protected, the secure data SD and the original secured data OSD may be different from each other. Therefore, the memory controller 100 transmits the third error signal ES3 to the host.

In the present exemplary embodiment, the verification mode S300 may be periodically operated. For example, the verification mode S300 may be periodically operated in a predetermined verification cycle.

Figure 8:
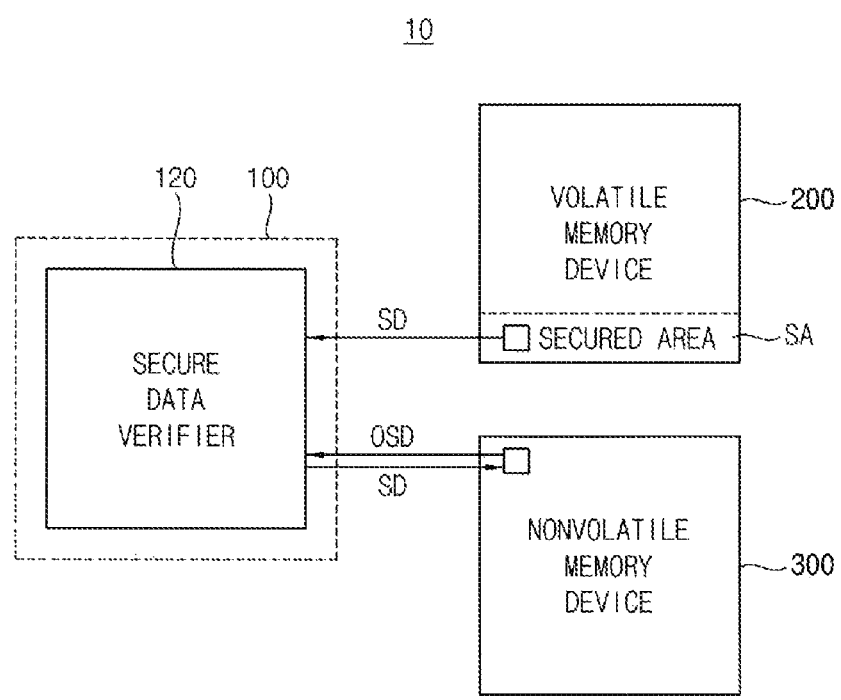
FIG. 8 is a block diagram illustrating an operation of the memory system of FIG. 1 according to other exemplary embodiments.
Figure 9:
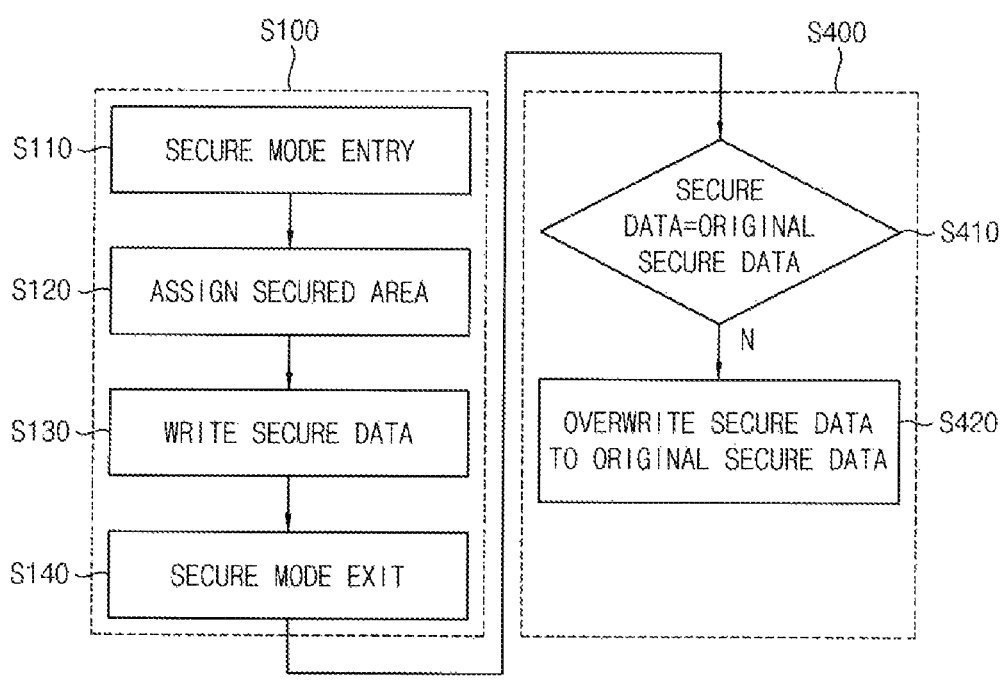
FIG. 9 is a flowchart illustrating the operation of the memory system of FIG. 1 in the secure mode and a termination mode according to exemplary embodiments.

FIG. 8 is a block diagram illustrating an operation of the memory system of FIG. 1 according to other exemplary embodiments. FIG. 9 is a flowchart illustrating the operation of the memory system of FIG. 1 in the secure mode S100 and a termination mode S400 according to exemplary embodiments.

Referring to FIGS. 4, 5, 8 and 9, the memory system 10 includes the memory controller 100 and the volatile memory device 200 controlled by the memory controller 100. The volatile memory device 200 includes the secured area SA. The memory system 10 may further include the additional memory device 300. In the present exemplary embodiment, the additional memory device 300 may be the nonvolatile memory device 300.

The memory controller 100 may include the secure mode controller 110. The secure mode controller 110 sets the secured area SA in the volatile memory device 200.

The control logic circuit 210 of the volatile memory device 200 may include the command decoder 211, the mode register 212 and the secure data controller 213. The command decoder 211 decodes the command CMD received from the memory controller 100. The mode register 212 sets the operation mode of the volatile memory device 200. The secure data controller 213 prohibits the write operations to the secured area SA.

The memory controller 100 may further include the secure data verifier 120. The secure data verifier 120 operates the verification of the secure data in the termination operation S400 of the memory system 10. When the termination command of the memory system is received, the secure data verifier 120 may receive the secure data SD stored in the secured area SA of the volatile memory device 200 and an original secure data OSD stored in the nonvolatile memory device 300. The original secure data OSD of the nonvolatile memory device 300 may be stored during manufacturing the memory system 10. The secure data verifier 120 may determine whether the secure data SD and the original secure data OSD are same as each other or not.

When the secure data SD and the original secure data OSD are different from each other, the secure data verifier 120 may determine the original secure data OSD as error secure data. When the secure data SD and the original secure data OSD are different from each other, the original secure data OSD may be overwritten by the secure data SD before terminating the memory system.

In the present exemplary embodiment, the secure data verifier 120 may be a functional and logical block, not a physical block.

Referring to FIG. 9, the secure mode S100 may include a step of secure mode entry (step S110), a step of assigning the secured area (step S120), a step of writing secure data (step S130) and a step of secure mode exit (step S140).

When the secure mode is started (step S110), the secured area SA is set in the volatile memory device 200 (step S120).

The secure data is written in the secured area SA (step S130).

When the secure data is written in the secured area SA, the secure mode is terminated (step S140).

When the secure mode S100 is terminated, the memory system may be operated in the normal operation mode S200. When a user executes a terminating command to terminate the normal operation mode S200, the memory system may be operated in a termination mode S400.

In the termination mode S400, the secure data SD stored in the secured area SA and the original secured data OSD, which are the original data of the secure data SD and stored in the nonvolatile memory device 300, are compared (step S410).

In the termination mode S400, when the secure data SD and the original secure data OSD are different from each other, the original secure data OSD of the nonvolatile memory device 300 may be overwritten by the secure data SD before terminating the memory system (step S420).

The original secured data OSD may be data which should not be changed by hacking or the malicious code when the memory system or the computing system including the memory system is booted.

The secure data SD is protected in the secured area SA not to be changed. Thus, if the secure data SD and the original secured data OSD are different from each other, it may be determined that the original secured data OSD is changed. Therefore, the memory controller 100 overwrites the secure data SD to the original secured data OSD so that the original secured data OSD may be recovered.

According to the present exemplary embodiment, the secured area SA is set in the volatile memory device 200, the secured area SA is the read-only area in the normal operation mode so that the writing data to the secured area SA is not allowed in the normal operation mode. Thus, the hacking of the volatile memory device 200 and the data forgery by abnormal access to the volatile memory device 200 may be prevented.

In addition, when the secure data SD and the original secured data OSD are different from each other in the verification mode, the error signal ES is transmitted to the host. Thus, the user may be noticed the hacking of the volatile memory device 200 and the data forgery by abnormal access to the volatile memory device 200.

In addition, when the secure data SD and the original secured data OSD are different from each other in the termination mode, the original secure data OSD is overwritten by the secure data SD. Thus, the damage due to the hacking of the volatile memory device 200 or the data forgery by abnormal access to the volatile memory device 200 may be prevented when the memory system is rebooted.

Figure 10:
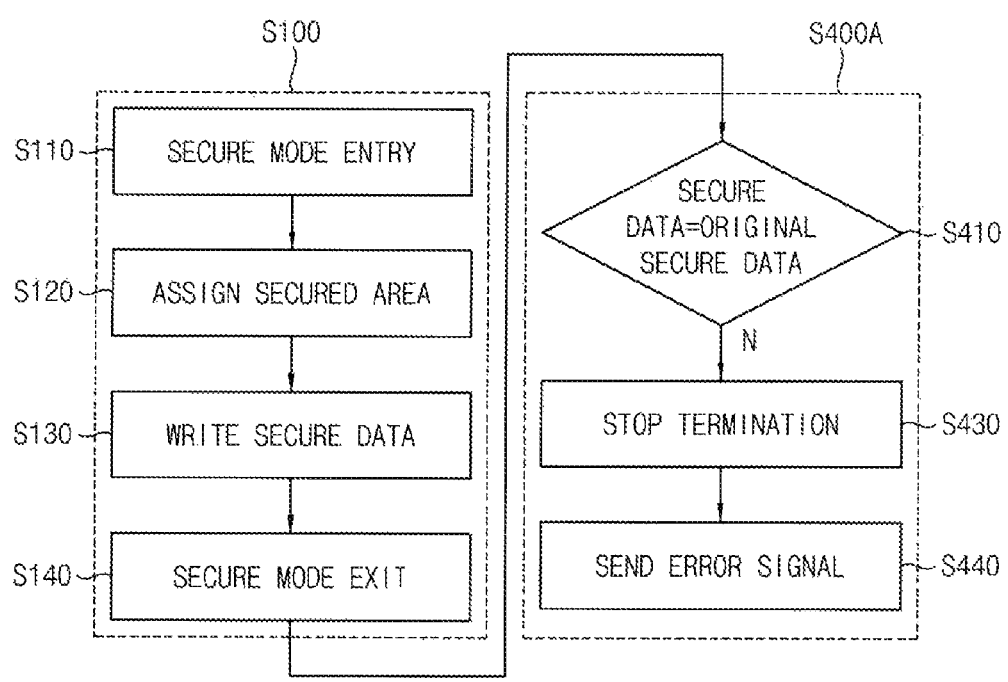
FIG. 10 is a flowchart illustrating an operation of the memory system of FIG. 1 in the secure mode and a termination mode according to other exemplary embodiments.

FIG. 10 is a flowchart illustrating an operation of the memory system of FIG. 1 in the secure mode and a termination mode according to other exemplary embodiments.

The method of operating the memory system according to the present exemplary embodiment is substantially the same as the method of operating the memory system of the previous exemplary embodiment explained referring to FIGS. 1 to 9 except for a termination mode S400A. Thus, the same reference numerals will be used to refer to the same or like parts as those described in the previous exemplary embodiment of FIGS. 1 to 9 and any repetitive explanation concerning the above elements will be omitted.

Referring to FIGS. 4, 5, 6, 8 and 10, the memory system 10 includes the memory controller 100, the volatile memory device 200, and the nonvolatile memory device 300 controlled by the memory controller 100. The volatile memory device 200 includes the secured area SA. The memory controller 100 may further include the secure data verifier 120. The secure data verifier 120 operates the verification of the secure data in the termination mode S400A of the memory system. When the termination command of the memory system is received, the secure data verifier 120 may receive the secure data SD stored in the secured area SA of the volatile memory device 200 and an original secure data OSD stored in the nonvolatile memory device 300. The original secure data OSD of the nonvolatile memory device 300 may be stored during manufacturing of the memory system 10. The secure data verifier 120 may determine whether the secure data SD and the original secure data OSD are same as each other or not.

When the secure data SD and the original secure data OSD are different from each other, the secure data verifier 120 may determine the original secure data OSD as error secure data. When the secure data SD and the original secure data OSD are different from each other, the termination operation of the memory system is stopped, the error signal ES is generated and the error signal ES is transmitted to the host.

In the present exemplary embodiment, the secure data verifier 120 may be a functional and logical block, not a physical block.

Referring to FIG. 10, when the secure mode S100 is terminated, the memory system may be operated in the normal operation mode S200. When a user executes a terminating command to terminate the normal operation mode S200, the memory system may be operated in the termination mode S400A.

In the termination mode S400A, the secure data SD stored in the secured area SA and the original secured data OSD, which are the original data of the secure data SD and stored in the nonvolatile memory device 300, are compared (step S410).

In the termination mode S400A, when the secure data SD and the original secure data OSD are different from each other, the terminating operation of the memory system may be stopped (step S430).

In the termination mode S400A, when the secure data SD and the original secure data OSD are different from each other, the error signal ES is generated and transmitted to the host (step S440). For example, the memory controller 100 may transmit the third error signal ES3 to the host.

According to the present exemplary embodiment, the secured area SA is set in the volatile memory device 200, the secured area SA is the read-only area in the normal operation mode so that the writing data to the secured area SA is not allowed in the normal operation mode. Thus, the hacking of the volatile memory device 200 and the data forgery by abnormal access to the volatile memory device 200 may be prevented.

In addition, when the secure data SD and the original secured data OSD are different from each other in the verification mode, the error signal ES is transmitted to the host. Thus, the user may be noticed the hacking of the volatile memory device 200 and the data forgery by abnormal access to the volatile memory device 200.

In addition, when the secure data SD and the original secured data OSD are different from each other in the termination mode, the terminating operation of the memory system is stopped and the error signal ES is transmitted to the host. Thus, the user may be noticed the hacking of the volatile memory device 200 and the data forgery by abnormal access to the volatile memory device 200.

Figure 11:
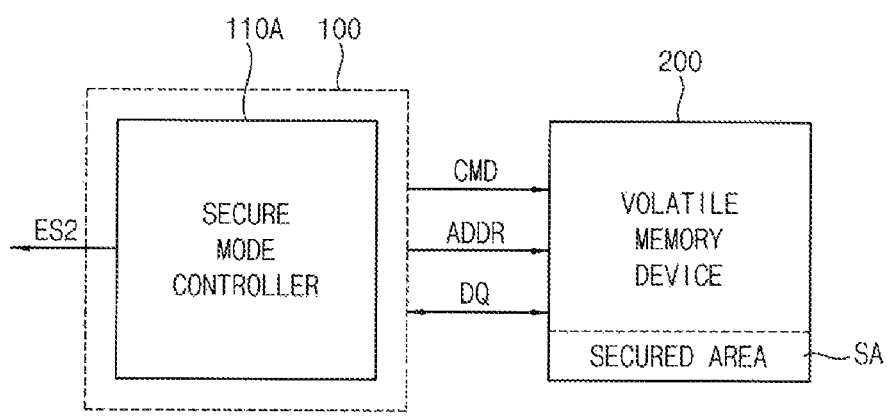
FIG. 11 is a block diagram illustrating an operation of the memory system of FIG. 1 according to other exemplary embodiments.

FIG. 11 is a block diagram illustrating an operation of the memory system of FIG. 1 according to other exemplary embodiments.

The method of operating the memory system according to the present exemplary embodiment is substantially the same as the method of operating the memory system of the previous exemplary embodiment explained referring to FIGS. 1 to 9 except that the normal operation mode is operated in the memory controller. Thus, the same reference numerals will be used to refer to the same or like parts as those described in the previous exemplary embodiment of FIGS. 1 to 9 and any repetitive explanation concerning the above elements will be omitted.

Referring to FIG. 11, the memory controller 100 may include a secure mode controller 110A. The secure mode controller 110A sets the secured area SA in the volatile memory device 200.

In the present exemplary embodiment, the secure mode controller 110A may function as both the secure mode controller 110 and the secure data controller 213 of FIG. 4.

In the present exemplary embodiment, the secure mode controller 110A may be a functional and logical block, not a physical block.

When the write command for the secured area SA is inputted in the normal operation mode, the secure mode controller 110A may not operate the write operation and may generate an error signal ES (e.g., the second error signal ES2 in FIG. 4). The secure mode controller 110A may transmit the second error signal ES2 to the host. In example embodiments, when the write operation of the volatile memory device 200 is requested for the secured area SA during the normal operation, the secure mode controller 110A of the memory controller 100 may transmit the second error signal ES2 to the host. In this case, the secure mode controller 110A may not transmit a write command to the volatile memory device 200.

According to the present exemplary embodiment, the secured area SA is set in the volatile memory device 200, the secured area SA is the read-only area in the normal operation mode so that the writing data to the secured area SA is not allowed in the normal operation mode. Thus, the hacking of the volatile memory device 200 and the data forgery by abnormal access to the volatile memory device 200 may be prevented.

Figure 12:
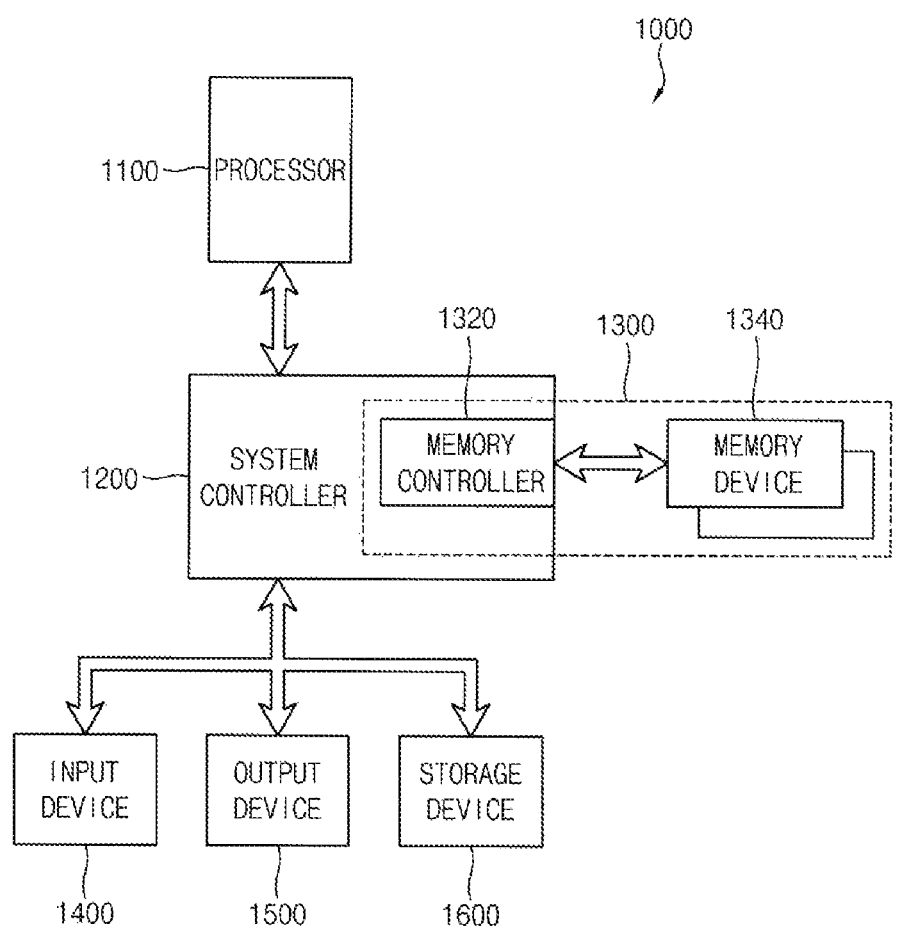
FIG. 12 is a block diagram illustrating a computing system including the memory system according to exemplary embodiments.

FIG. 12 is a block diagram illustrating a computing system including the memory system according to exemplary embodiments.

Referring to FIG. 12, a computing system 1000 includes a processor 1100, a system controller 1200 and a memory system 1300. The computing system 1000 may further include an input device 1400, an output device 1500 and a storage device 1600.

The memory system 1300 includes one or more memory devices 1340, and a memory controller 1320 for controlling the one or more memory devices 1340. The one or more memory devices 1340 may include at least one volatile memory device. The memory controller 1320 may be included in the system controller 1200. The volatile memory device 1340, the memory controller 1320 and the memory system 1300 may operate based on the methods according to disclosed exemplary embodiments.

The processor 1100 may perform various computing functions, such as executing specific software instructions for performing specific calculations or tasks. The processor 1100 may be connected to the system controller 1200 via a processor bus. The system controller 1200 may be connected to the input device 1400, the output device 1500 and the storage device 1600 via an expansion bus. As such, the processor 1100 may control the input device 1400, the output device 1500 and the storage device 1600 using the system controller 1200.

The above described embodiments may be used in a memory device or system including the memory device, such as a mobile phone, a smart phone, a personal digital assistants (PDA), a portable multimedia player (PMP), a digital camera, a camcorder, a digital television, a set-top box, a music player, a portable game console, a navigation device, a personal computer (PC), a server computer, a workstation, a tablet computer, a laptop computer, a smart card, a printer, a wearable system, an internet of things (IoT) system, a virtual reality (VR) system, an augmented reality (AR) system etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of operating a memory system, the method comprising:
when the memory system is being booted:
by a memory controller of the memory system, setting a secured area in a volatile memory device of the memory system during a secure mode of a booting process;
by the memory controller, writing secure data in the secured area during the secure mode; and
after ending the booting process, when the volatile memory device receives a write command for the secured area during a normal operation mode, preventing a write operation from occurring in the volatile memory device, generating an error signal from the volatile memory device, and transmitting the error signal to the memory controller.

2. The method of claim 1, wherein setting the secured area is performed before the memory system is electrically connected to a network and an external port.

3. The method of claim 2, wherein setting the secured area is performed in a BIOS (basic input/output system) level when the memory system is being booted.

4. The method of claim 1, wherein setting the secured area is performed by a start address of the secured area and an end address of the secured area.

5. The method of claim 1, wherein setting the secured area is performed by a secure mode controller of the memory controller, and
wherein preventing the write operation and generating the error signal are performed by a secure data controller of a control logic circuit of the volatile memory device.

6. The method of claim 5, further comprising:
by the secure mode controller, storing secure area setting information corresponding to the secured area in a mode register of the control logic circuit of the volatile memory device using a mode register setting (MRS) signal.

7. A method of operating a memory system, the method comprising:
by a memory controller of the memory system, setting a secured area in a volatile memory device of the memory system during a secure mode;
by the memory controller, writing secure data in the secured area during the secure mode;
when the memory controller receives a write command for the secured area during a normal operation mode, preventing the write command from being transmitted to the volatile memory device and generating a first error signal from the memory controller;
during a verification mode, comparing the secure data stored in the secured area to original secure data, which is original data of the secure data; and
during the verification mode, when the secure data and the original secure data are different from each other, generating a second error signal from the memory controller.

8. The method of claim 7, wherein the verification mode is periodically operated.

9. The method of claim 7, wherein the original secure data is stored in the nonvolatile memory device.

10. The method of claim 7, further comprising:
during a termination mode, comparing the secure data stored in the secured area to the original secure data; and
during the termination mode, when the secure data and the original secure data are different from each other, overwriting the secure data to the original secure data.

11. The method of claim 7, further comprising:
during a termination mode, comparing the secure data stored in the secured area to the original secure data; and
during the termination mode, when the secure data and the original secure data are different from each other, stopping a termination operation and generating a third error signal from the memory controller.

12. The method of claim 7, wherein the secure data includes at least one of a kernel of an operating system (OS), user data, and a header file of an essential application.

13. A method of operating a memory system, the method comprising:
by a memory controller of the memory system, when the memory system is being booted, permitting a first area in a volatile memory device of the memory system to store first data during a first mode of a booting process; and
after ending the booting process, when the memory system requests a write operation for the first area, preventing the write operation from occurring in the volatile memory device, generating a first error signal from the volatile memory device, and transmitting the first error signal to the memory controller,
wherein the first area includes a start address and an ending address, and
wherein the first mode is operated before an operating system (OS) is loaded.

14. The method of claim 13, wherein preventing the write operation includes not transmitting a write command to the volatile memory device from the memory controller.

15. The method of claim 13, further comprising:
comparing the first data stored in the first area to a second data stored in a nonvolatile memory device of the memory system during a second mode; and
when the first data and the second data are different from each other, generating a second error signal from the memory controller,
wherein the second mode is a normal operation mode.

16. The method of claim 15, when the first data and the second data are different from each other, further comprising overwriting the first data to the nonvolatile memory device.

17. The method of claim 15, wherein the comparing is periodically performed.

* * * * *